3,083,394
WINDSHIELD WIPER SYSTEM
Anthony C. Scinta, Hamburg, N.Y., assignor to Trico Products Corporation, Buffalo, N.Y.
Filed June 22, 1960, Ser. No. 37,965
9 Claims. (Cl. 15—250.14)

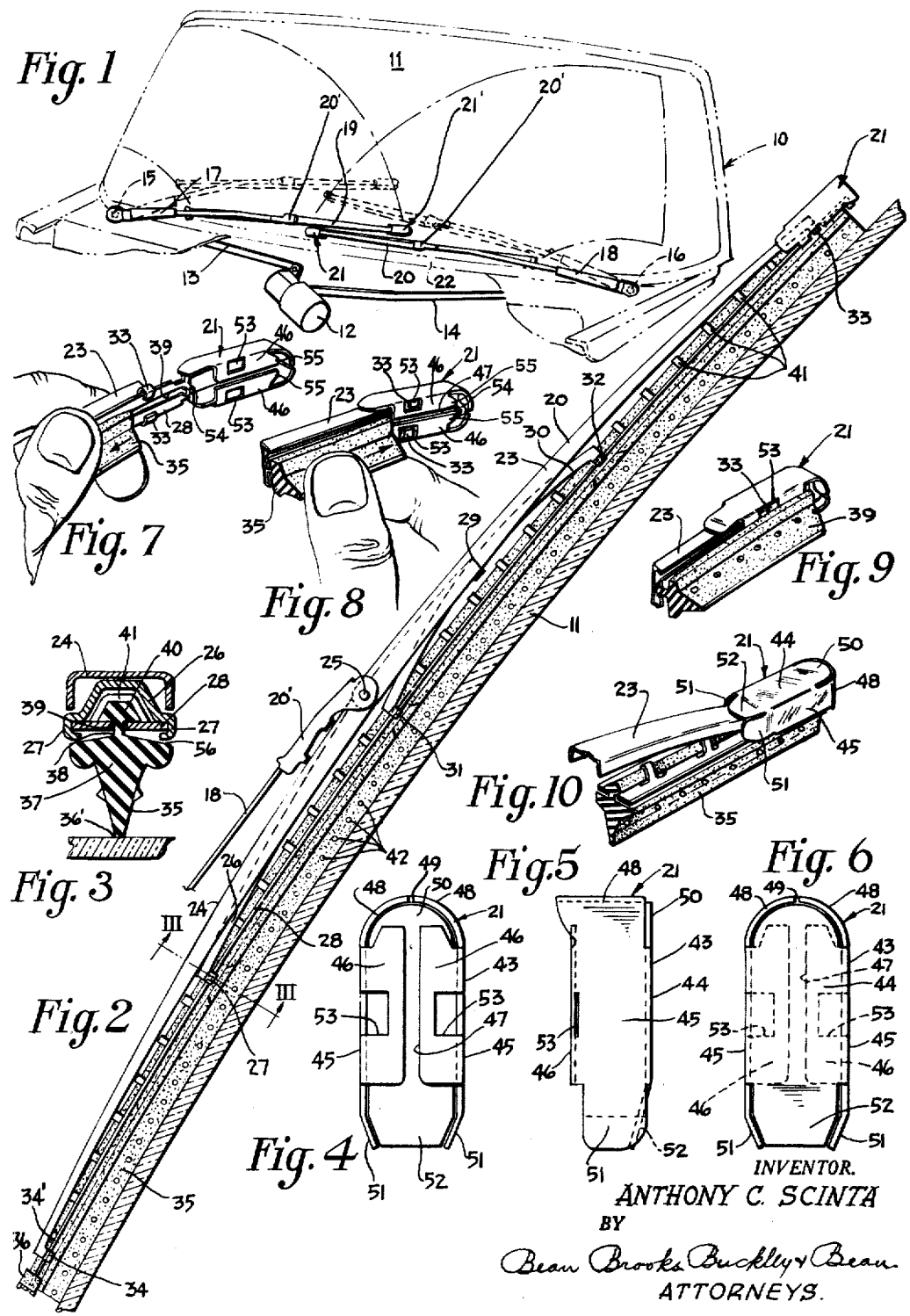

The present invention relates to an improved windshield wiper for use in an improved wiper system wherein wipers traveling in opposed relationship produce overlapping wipe patterns and wherein the wipers are parked with their ends in overlapping relationship at their inboard ends of travel.

In certain wiper installations it is desirable that the wipers provide overlapping wipe patterns during their inboard ends of travel in order to clear a relatively large portion of the windshield. In installations of this type, the wipers are usually parked at their extreme inboard limits of travel. In certain prior art installations it has been necessary to space the wipers sufficiently far from each other when they are parked so that when the wiper system is started up the ends of the wipers do not catch on each other. This spacing is undesirable because it causes one wiper to remain in an undesirably high position on the windshield when the wiper system is not being used. Furthermore, in other installations currently in use, a linkage causes the upper wiper to move faster than the lower wiper at the beginning of travel from their parked positions. This linkage is intended to permit the wipers to park in abutting relationship but to prevent their becoming entangled when they move away from a parked position. Thus, while installations utilizing an opposed overlapping type of wiping pattern are originally installed to avoid interference or contact between the blades, it may well happen that wipers may become improperly aligned, as by a person carelessly reversing the positions of the parked blades when the windshield is manually cleaned. This reversing is quite common, and in a system wherein the upper wiper is intended to travel faster is accidentally positioned below the lower wiper, it can readily be seen that the faster-moving wiper will move upwardly into contact with the slower-moving wiper. Such action is particularly undesirable in a system wherein the wipers are used on a curved windshield. In wipers for curved windshields, the outer levers are slightly arched and the outer ends of these levers are closest to the windshield. Therefore, during the initial portion of wiper movement away from a wiper parking position wherein the wiper blades are reversed, as noted above, the end of the faster-moving lowermost-positioned blade is caused to pass along the marginal edge of the slightly arched part of the other blade lever, and the end of the faster-moving blade slides into the space between the outer wiper lever and the wiping blade or element, and it is in this manner that the blades can become interlocked thereby tending toward the destruction of the blade assemblies. In other words, the fact that one wiper is faster moving than the other will enhance the possibility of their locking when their positions are reversed on the windshield, and thus the system which was designed to avoid blade entanglement, promotes such entanglement when the wiper positions are reversed. This situation is particularly detrimental in connection with electric wiper motors which cannot be reversed at the intermediate portions of their outward strokes for the purpose of permitting the entangled wipers to be separated; and this can result in the destroying of the wipers during an attempt to untangle them. It is with overcoming the foregoing shortcomings of the prior art that the present invention is concerned.

It is accordingly the primary object of the present invention to provide a simple and efficient wiper system which will positively guard two associated wipers adapted to operate in opposed overlapping relationship from interlocking, whether they operate in their normal intended manner or whether they are inadvertently reversed in position. It is a related object of the present invention to provide a wiper attachment which will permit the adjacent sides of end portions of the wipers to lie in substantially abutting relationship against the lower windshield molding when they are parked without the possibility of interlocking when they are initially started from their parked positions.

It is another object of the present invention to provide a fender or end cap which is adapted to be securely mounted on existing types of wiper assemblies in such a manner that it cannot be accidentally removed therefrom during wiper operation. It is a related object of the present invention to provide an end cap or fender construction which, in addition to being readily attachable to the ends of the wiper, as noted above, it is likewise readily detachable therefrom whenever it is desired to replace the wiper blade element in the wiper superstructure, as is required in certain types of wiper assemblies. It is a further related object of the present invention to provide an end cap or fender portion which is capable of achieving the foregoing objectives and which can be easily removed from its operating position and reinstalled without the use of tools of any type. Other objects and attendant advantages of the present invention will readily be perceived hereafter.

In accordance with the present invention, the wiper system includes two wipers which travel in opposed overlapping relationship and have fenders or end caps mounted on the outer ends thereof to prevent them from becoming entangled with each other in the event that their positions are reversed on the windshield, or in the event that the wipers for some other reason lose their original alignment. The end caps prevent the entanglement of the wipers under all circumstances because they have side walls and rounded end walls which prevent the engagement between those portions of the wipers which are prone to becoming entangled upon contact. In the foregoing respect, the rounded end walls of each fender smoothly guide the end portions of the wipers away from each other in the event that they tend to contact each other during their inward travel. Each end cap or fender is adapted to be securely mounted on its associated wiper blade because the lower wall of the end cap is held in latching engagement with a portion of the blade superstructure and another portion of the end cap is held in latching engagement with a portion of the backing strip on which the wiping element is mounted. This dual latching engagement is maintained whenever the end cap is in its normal position on the wiper because the bottom wall of the end cap is adapted to fit between the wiping element and the backing strip, the resilience of the wiping element thus preventing separation of the end cap from the wiper. In the event that separation of the end cap is desired, it is merely necessary to slide the blade element away from the bottom wall, and thereafter tilt the end cap out of engagement with the superstructure and the backing strip to thereby release the dual latching engagement. When it is desired to install an end cap, it is merely necessary to pull the wiper blade away from its normal position on its backing strip, place the end cap in position so that the dual latch is locked, and thereafter release the blade element so that its natural resilience prevents the end cap from tilting and thereby unlatching the dual latching arrangement utilized to retain it in position on the wiper. The present invention will be more fully understood when the following portions of the specification are read in conjunction with the accompanying drawings wherein:

FIG. 1 is a fragmentary perspective view of an automotive vehicle mounting the system and wipers of the present invention;

FIG. 2 is a side elevational view of a wiper which may be utilized with the present invention;

FIG. 3 is a detailed view of certain of the wiper superstructure taken along line III—III of FIG. 2;

FIG. 4 is a bottom plan view of the end cap or fender of the present invention;

FIG. 5 is a side elevational view of the fender or end cap of the present invention;

FIG. 6 is a top plan view of the fender or end cap of the present invention;

FIG. 7 is a view showing a wiper with the blade element withdrawn from its normal position and the fender in position to be mounted on the wiper;

FIG. 8 is a view showing the end cap mounted on the wiper and the wiping element in the position which it occupies prior to being released to lock the end cap in position;

FIG. 9 is a view showing the blade element released to hold the latching arrangement between the end cap and wiper in engagement; and FIG. 10 is a fragmentary perspective view of the end cap or fender of the present invention mounted on a wiper.

In FIG. 1 an automotive vehicle 10 is shown having a curved windshield 11 mounted thereon in the usual manner. Suitably mounted underneath the cowl of the vehicle is a windshield wiper motor 12 of the electric type which cannot reverse its direction of motion at midstroke. With this type of motor the present wiper system is particularly beneficial, as noted above, because it prevents entanglement of wipers which would usually have to be destroyed in the process of untangling. However, it will readily be appreciated that the wiper system of the present invention may also be used with fluid pressure motors notwithstanding that the latter can have the wipers reversed at mid-stroke, thereby obviating the necessity to destroy the wipers in order to untangle them. Links 13 and 14 extend from motor 12 to rockshafts 15 and 16, respectively, which, in turn, mount wiper arms 17 and 18, respectively. Wipers 19 and 20 are mounted on the ends of arms 17 and 18, respectively. This mounting may be effected by the use of a conventional clip which permits the blade to be removed from the arm or if desired may be of the type wherein the blade is securely riveted to the arm so that they are inseparable. In the latter type of construction the wiping blade element and its supporting backing strip (to be described hereafter) are removable as a unit for replacement. It is with the last-mentioned type of system that the end caps or fenders 21 and 21' which are mounted on the ends of wiper blades 20 and 19, respectively, are particularly adapted to be used because they can be removed from their normal position without tools to permit removal of the blade and backing strip, and thereafter be reinserted in position on a new blade and backing strip, as described in greater detail hereafter.

Associated with links 13 and 14 is another linkage structure (not shown) for causing lower wiper 20 to park substantially in abutment with the lower molding 22 of windshield 11, and the upper wiper 19 to park in substantially abutting relationship with lower wiper 20. Furthermore, this linkage is intended to cause wiper 19 to move faster than wiper 20 during the initial portion of travel away from a parked position thereby tending to prevent the outer end of wiper 20 from engaging the underside of wiper 19 during this initial portion of travel. It is deemed that the exact structure which is used to effect the foregoing type of operation need not be described in specific detail because the exact structure, per se, does not form any part of the present invention; it is only the type of action which this structure produces, irrespective of the particular linkages utilized to obtain it, that is pertinent with respect to the present invention.

The wiper 20 will be described hereafter, it being understood that wiper 19 may be identical construction. Wiper 20 includes a superstructure consisting of channel shaped levers 23 and 24 which are movably pinned to each other by rivet 25 which also pivotally supports clip 20'. A spring (not shown) encircles rivet 25 and biases levers 23 and 24 in a clockwise and counterclockwise direction when view from FIG. 2. A yoke-like lever 26 of channel shaped cross section is also pivotally mounted on rivet 25. The lower end of lever 26 is formed into fingers 27 which slidably engage opposite edge portions of flexible backing strip 28. The upper portion of lever 26 is formed into similar fingers 29 which rockably engage opposite sides of the central portion of channel shaped yoke 30. Yoke 30 in turn has its ends 31 and 32 formed into fingers which are similar to finger 27. The ends 33 and 34 of levers 23 and 24, respectively, are also formed into finger-like members such as 27 shown in FIG. 3. Thus four sets of fingers are provided at 27, 31, 32, and 33 for slidably engaging opposite edge portions of flexible backing strip 28 for transmitting pressure from wiper arm 18 to the rubber blade or wiping element 35 carried by the backing strip. However, the fingers located at 34 engage a notch 34' in the backing strip for anchoring the blade and backing strip assembly to the superstructure. Furthermore, plastic cap 36 is mounted on the lower end of flexible backing strip 28. The assembly of levers 23, 24, 26, and 30 may be considered the conforming mechanism for conforming the blade to various parts of a curved windshield, as is well known.

Blade 35 includes a wiping lip 36' which extends downwardly from central portion 37. A reduced neck portion 38 is adapted to fit within slot 39 of the flexible backing strip 28. An enlarged top portion 40 of the blade 35 is located above slot 39. A plurality of ribs 41 are formed at spaced intervals along the top of the backing strip for the purpose of leading rigidity to the backing strip against lateral distortion. Raised protuberances 42 are provided at spaced intervals along each side of the central portion 37 of the blade 35 in a manner which is known in the art.

As can be seen from FIG. 1, in order for the wipers to clear a relatively large portion of the windshield, the wipe patterns overlap at the inboard ends of wiper travel. A fender or end cap 21 is adapted to be mounted on the outer end of lever 23 of wiper 20 and another fender or end cap 21' is adapted to be mounted on the outer end of the analogous lever of wiper 19. Fenders 21 and 21' are identical in construction and therefore only one will be described. Fenders 21 and 21' prevent entangling contact between the outer ends of the wipers in their inboard areas of travel. In this respect it will become apparent hereafter that fender 21 prevents the outer end of wiper 20 from getting caught between the superstructure of wiper 19 and the backing strip. The same is true of fender 21' which prevents the outer end of wiper 19 from becoming caught between lever 23 and backing strip 28 of wiper 20 in the event that the positions of the wipers on the windshield are inadvertently reversed, as during the manual cleaning of the windshield. Furthermore, fenders 21 and 21' prevent the flingers of one of the wipers from becoming entangled with the fingers of the other of the wipers.

As can be seen from FIGS. 4, 5, and 6, fender 21 consists of a central body portion 43 of substantially solid rectangular configuration having top wall 44, side walls 45, and split bottom wall consisting of wall portions 46 having a slot 47 extending therebetween. All of the above-mentioned wall portions are made from a single piece of metal, properly bent, as is evident from the drawings. Side walls 45 extend upwardly into rounded end walls 48 which are bent into a circular shape and meet at joint 49, which may be left as it is, or joined by a metal fusing operation, if desired. Wall 44 has its upper end portion formed into semicircular shape 50 and lies within the semicircle formed by end walls 48. Extending from the lower portions and integral with side walls 45 are inwardly extending tabs 51, the ends of which are adapted to abut the end of lever 23 (FIG. 10). Positioned between inwardly extending tab 51 and extending from top wall 44 is a tab 52 which rests against the top of lever 23.

In order to place fender or end cap 21 in position on the end of wiper 20, it is merely necessary to slide blade 35 in the slot 39 in the direction of the arrow shown in FIG. 7 to thereby separate the end portion of backing strip 28 from the blade 35. This can easily be done because neck 38 of blade 35 fits loosely within slot 39 of the backing strip. The blade is retained in this position and the end of the backing strip is inserted into the inside of fender 21. A point will be reached wherein fingers 33 are abreast of apertures 53 in wall portions 46 and at this time U-shaped end 54 of backing strip 28 will protrude from the space between the ends 55 of walls 46 and end walls 48 (see FIG. 8). When fender 21 assumes the position shown in FIG. 8, fingers 33 of lever 23 will be located in apertures 53. When fender 21 assumes the foregoing position, blade 35 is released and its natural resilience will cause it to move in the direction of the arrow in FIG. 8 until it comes to rest in the position shown in FIG. 9. It will be noted that slot 47 between bottom walls 46 will accommodate the neck 38 of wiper 35. Furthermore, the top wall 56 of body portion 35 (FIG. 3) will be located proximate to one side of bottom walls 46, whereas the other side of bottom walls 46 will be adjacent the bottom side of backing strip 28. It can thus be seen that a double latching arrangement is provided wherein one latch consists of the fingers 33 of yoke 23 being located in apertures 53 of the fender 21, and the second latch consists of U-shaped portion 54 of backing strip 28 engaging ends 55 of bottom walls 46. Furthermore, it is the inherent construction of the wiper blade 35 itself which holds the above-described double latching arrangement in engagement. When it is desired to remove fender 21 from the end of wiper 20, it is merely necessary to pull blade 35 in the direction of the arrow shown in FIG. 7 and thereafter move the double latching arrangement described above out of engagement to permit the fender 21 to be moved axially of the blade for its removal.

It can thus be seen that since side walls 45 project beyond the sides of each wiper that it is impossible for the claws of either of the wipers to catch on structure located on the end of the other wiper while the wipers are in the immediate vicinity of their abutting parked relationship, because these side walls provide positive spacing between the wipers. Furthermore, the rounded end walls 48 of each of the fenders are dimensioned in such a manner as to prevent the end of the wiper mounting it from getting caught between the outer lever, such as 23, and the backing strip of the other wiper while the wipers are moving. Furthermore, the rounded ends 48 and rounded inwardly extending tabs 51 prevent the fenders of each of the wipers from catching on each other and act to guide the ends of the wipers away from entangling engagement in the event that there is any contact whatsoever between any portions of one wiper with the fender mounted on the opposite wiper.

It will, of course, be appreciated that the solid line positions of the wipers and arms in FIG. 1 denote the positions in which these elements are parked. However, during actual oscillatory movement of the wipers and arms across the windshield during wiping, the innermost limit of wiper travel is denoted by the dotted line showings in FIG. 1.

From the foregoing description it can thus be appreciated that the present invention is manifestly capable of achieving the above-enumerated objects, and while a preferred embodiment of the present invention has been disclosed, it is to be understood that it is not to be limited thereto, but may be otherwise embodied within the scope of the following claims.

What is claimed is:

1. A windshield wiper comprising a wiping blade, a backing strip for supporting said wiping blade, a superstructure for supporting said backing strip at select spaced areas along the longitudinal axis thereof, and fender means mounted on the outboard end of said wiper for preventing entangling engagement of said wiper with an adjacent wiper, said fender means including first means for engaging a portion of said superstructure and interlocking therewith and second means spaced from said first means for engaging a portion of said backing strip and interlocking therewith, the engagement effected by said first and second means thereby retaining said fender means in position on said wiper.

2. A windshield wiper as set forth in claim 1 wherein said fender means comprises a member having a plurality of side walls and a bottom wall, and wherein slot means are provided in said bottom wall for permitting said bottom wall to receive a portion of said blade therein, said bottom wall being so positioned on said blade assembly to lie between a portion of said blade and a portion of said backing strip whereby said positioning in combination with said first and second means securely mounts said fender means on said wiper.

3. A windshield wiper system comprising a pair of wipers, a pair of wiper carrying arms for carrying said wipers, motor means, linkage means coupled between said motor means and said wiper carrying arms for moving said wiper carrying arms in opposed motion when said motor means are in operation, said wipers being mounted so that one wiper moves slightly in advance of the other wiper and so the wipe patterns overlap at their inboard ends of travel and so that said wipers are brought to rest in a parked position with the end of one wiper overlying the end of the other wiper, and fender means provided on the end of each of said wipers and projecting laterally therefrom for ridingly contacting the side of the other of said wipers inwardly of said fender means to thereby insure a minimum spacing between said wipers in the event that said wipers tend to contact each other when they are traveling in an area where their wipe patterns overlap.

4. A windshield wiper system comprising a pair of wipers, a pair of wiper carrying arms for carrying said wipers, motor means, linkage means coupled between said motor means and said wiper carrying arms for moving said wiper carrying arms in opposed motion when said motor means are in operation, said wipers being mounted so that one wiper moves slightly in advance of the other and so that the wipe patterns overlap at their inboard ends of travel and so that the wipers are brought to rest in a parked position with the end of one wiper overlying the end of the other wiper, said motor means and linkage means having an operating characteristic which prevents said wipers from reversing their motion at any intermediate point during their outboard travel from a parked position, and fender means mounted on the outer ends of each of said wipers for ridingly contacting the side of the other of said wipers to thereby prevent the end of one of said wipers from becoming entangled with the end portion of the other of said wipers inwardly of said fender means in the event that said wipers tend to contact each other when they are traveling in an area where their wipe patterns overlap.

5. A windshield wiper system comprising a pair of wipers, a pair of wiper carrying arms for carrying said wipers, motor means, linkage means coupled between said motor means and said wiper carrying arm for moving said wiper carrying arms in opposed motion when said motor means are in operation, said wipers being mounted so that one wiper moves slightly in advance of the other and so that the wipe patterns overlap at their inboard ends of travel and so that the wipers are brought to rest in a parked position with the end of one wiper overlying the end of the other wiper, said linkage causing said overlying wiper to travel slightly faster than the other wiper, and fender means mounted on the outer ends of each of said wipers for ridingly contacting the sides of other of said wipers inwardly of said fender means to thereby prevent the end of said faster-moving normally upper wiper from becoming entangled with the end portion of the other of said wipers inwardly of said fender means in the event that the positioning of said wipers is reversed on the windshield when said wipers are in a parked position, and for preventing said other of said wipers from becoming entangled with the portion of said upper wiper inwardly of said fender means if their positions are not reversed but if said wipers are out of alignment.

6. A fender adapted to be mounted on the outer end of a wiper for preventing said wiper from becoming entangled with another wiper adjacent thereto comprising a hollow central body portion having a top wall and side walls and a bottom wall having a slot therein adapted to receive a portion of a wiping element, an outer rounded end wall merging into said side walls, and apertures in said bottom wall for receiving portions of the wiping element supporting structure in interlocking engagement.

7. A fender as set forth in claim 6 wherein said portions of said superstructure received by said apertures in said bottom wall are the fingers of the wiper superstructure to thereby provide a latching engagement and wherein said bottom wall is adapted to lie between the backing strip of a wiper and a portion of the wiping element.

8. A fender as set forth in claim 7 wherein said fender includes an additional aperture spaced from said apertures in said bottom wall for receiving another projection on said wiping element supporting structure to thereby provide a double latching engagement with a wiper.

9. A fender adapted to be mounted on the outer end of a wiper for preventing said wiper from becoming entangled with another wiper adjacent thereto comprising a hollow central body portion having side walls and a rounded end wall merging with said side walls, a bottom wall and means on said fender for receiving a portion of a wiping element supporting structure in interlocking engagement, and an opening in said bottom wall to permit said bottom wall to lie between a portion of said wiping element and a portion of the supporting structure for said wiping element whereby said wiping element and said supporting structure cause said fender to be retained in a mounted condition in interlocking engagement on the outer end of said wiper.

References Cited in the file of this patent

FOREIGN PATENTS

| 826,703 | Great Britain | Jan. 20, 1960 |
| 1,162,314 | France | Apr. 8, 1958 |
| 1,237,684 | France | June 20, 1960 |

UNITED STATES PATENT OFFICE
CERTIFICATE OF CORRECTION

Patent No. 3,083,394                      April 2, 1963

Anthony C. Scinta

It is hereby certified that error appears in the above numbered patent requiring correction and that the said Letters Patent should read as corrected below.

Column 4, line 41, for "leading" read -- lending --.

Signed and sealed this 8th day of October 1963.

(SEAL)
Attest:

ERNEST W. SWIDER
Attesting Officer

EDWIN L. REYNOLDS
Acting Commissioner of Patents